July 16, 1929.        R. S. DRUMMOND        1,720,887
INDEXING MECHANISM
Filed Nov. 10, 1924        2 Sheets-Sheet 1

Inventor
Robert S. Drummond

By Whittemore Hulbert Whittemore
& Belknap — Attorneys

July 16, 1929.　　　R. S. DRUMMOND　　　1,720,887
INDEXING MECHANISM
Filed Nov. 10, 1924　　　2 Sheets-Sheet 2
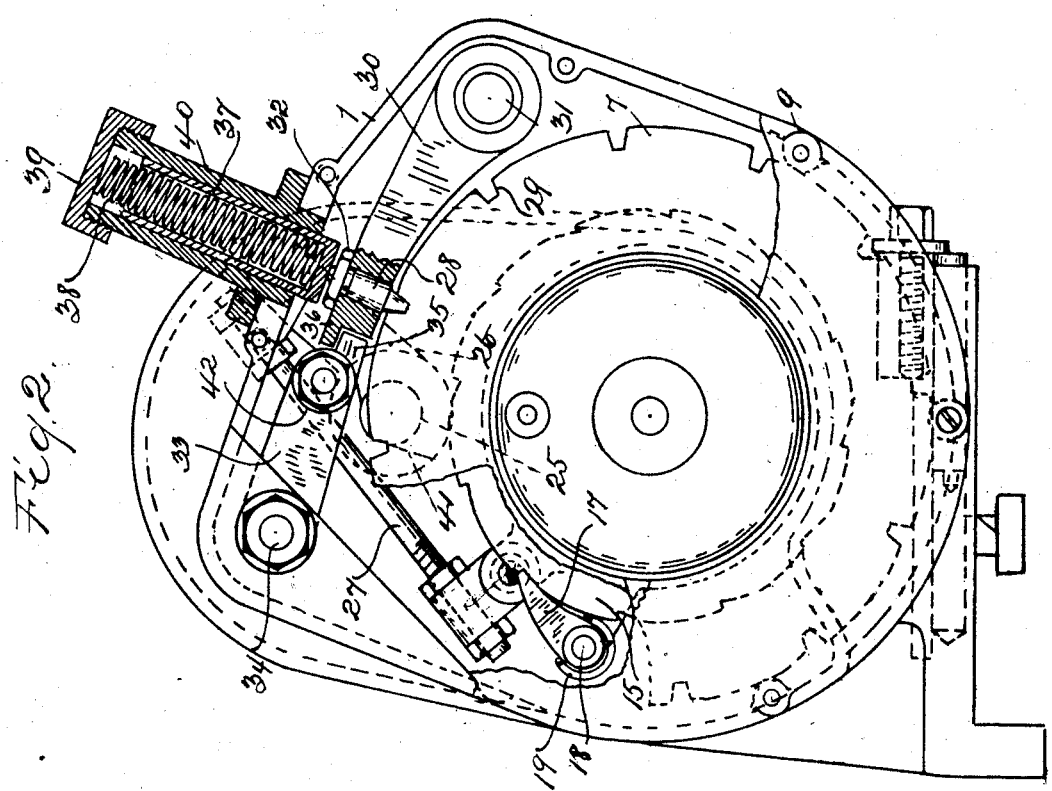
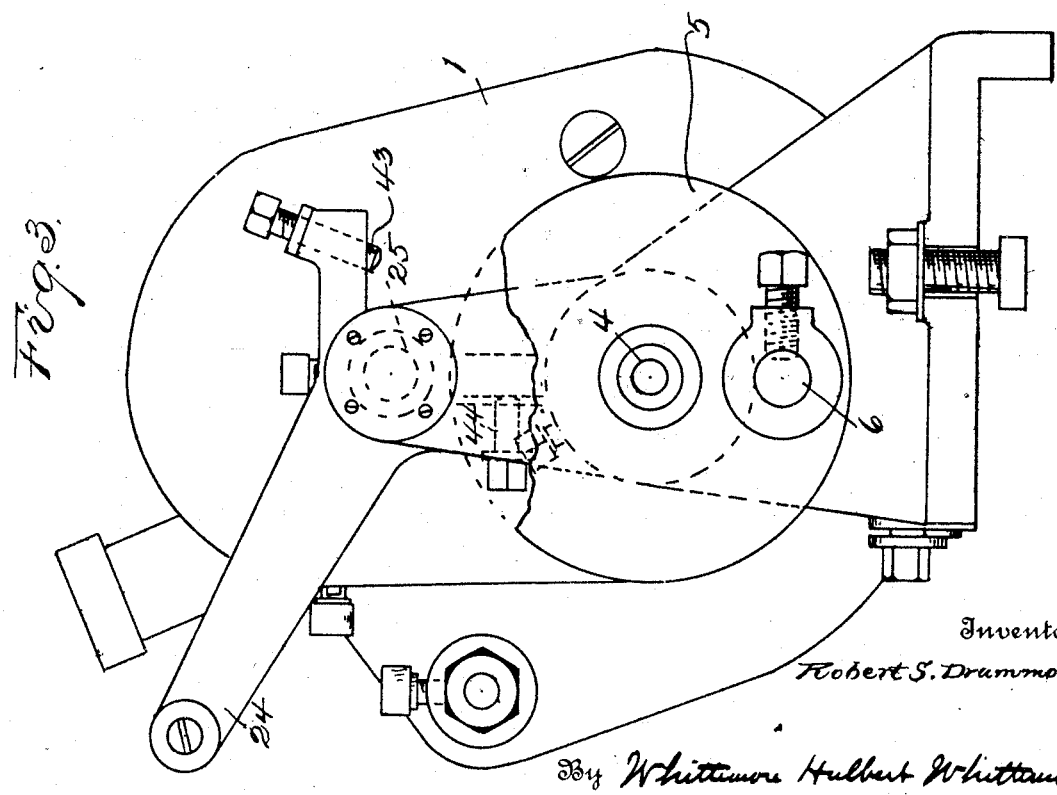
Inventor
Robert S. Drummond
By Whittemore Hulbert Whittemore
+ Belknap　　Attorneys Patented July 16, 1929.

1,720,887

UNITED STATES PATENT OFFICE.

ROBERT S. DRUMMOND, OF DETROIT, MICHIGAN, ASSIGNOR TO GEAR GRINDING MACHINE COMPANY, OF DETROIT, MICHIGAN, A CORPORATION OF MICHIGAN.

INDEXING MECHANISM.

Application filed November 10, 1924. Serial No. 749,025.

The invention relates to indexing mechanisms and is particularly applicable to form grinding machines. Heretofore it has been difficult to accurately index the work with indexing mechanisms of that type having a journaled index plate owing to the fact that the momentum stored up in the index plate carried the same past the desired position. This was especially true with indexing mechanisms having index plates of the larger diameters.

This invention has for one of its objects the provision of an indexing mechanism which is designed to permit of using an index plate of the larger diameters and at the same time provide for accurate indexing of the work. The invention has for other objects the provision of means for rotating the index plate at a decreasing angular velocity to thereby decrease the momentum stored up in the index plate. The invention has for further objects the provision of an indexing mechanism having a common means for rotating the index plate at a decreasing velocity and for controlling the operation of the means for holding the index plate in its adjusted position.

With these as well as other objects in view the invention resides in the novel features of construction and combinations and arrangements of parts as more fully hereinafter set forth.

In the drawings:

Figure 2 is a rear end view, partly in section and with the end plate removed;

Figure 3 is a front end view;

Figure 1:
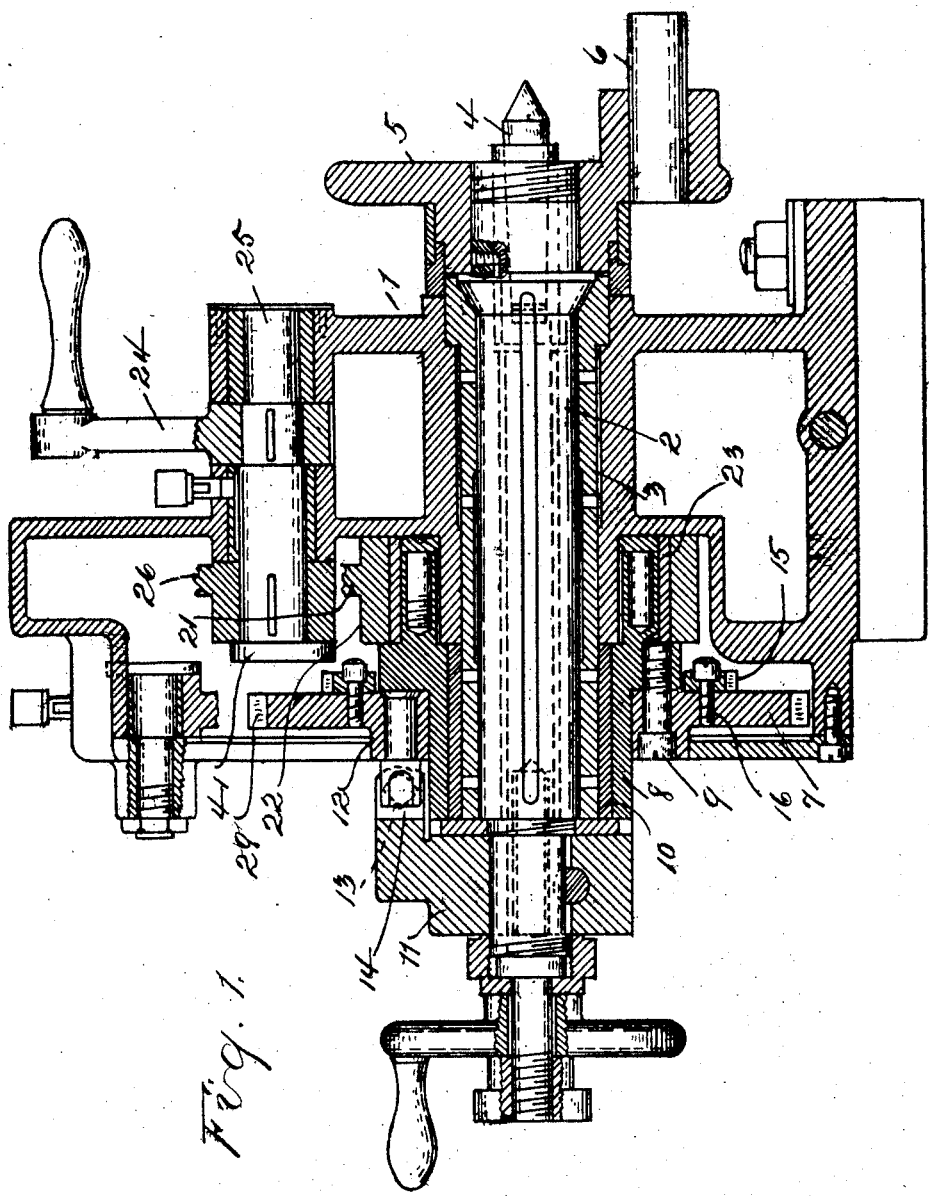
Figure 1 is a vertical longitudinal section through an indexing mechanism embodying my invention.
Figure 4:
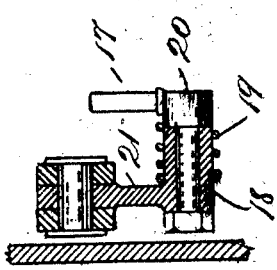
Figure 4 is a cross section on the line 4—4 of Figure 2.

1 is the body of the indexing mechanism and 2 the spindle which is journaled in the quill 3, this latter extending through the body. 4 is the work center which is secured to the front end of the spindle and 5 is the dog plate also secured to the front end of the spindle and provided with the transverse stud 6 for engaging the work to rotate the same upon rotation of the spindle.

7 is the index plate secured to the index plate center 8 by suitable means such as the screw bolts 9. The index plate center is freely journaled upon the bushing 10 which surrounds the front end of the quill 3. 11 is the spindle arm secured upon the spindle 2 near its front end and adapted to be rotated from the index plate 7 by suitable means such as the stud 12 secured to the index plate and engageable between set screws 13 threaded into bifurcations 14 which latter extend transversely of and are preferably integral with the spindle arm.

For indexing the work, I have provided the ratchet plate 15 which is secured upon the front side of the index plate 7 by suitable means such as the screw bolts 16. This ratchet plate is provided with peripherally spaced notches which are engageable by the pawl 17. This pawl is mounted upon the pin 18 and yieldably held to engage in the notches by means of the coil spring 19 which surrounds the boss 20 upon the ratchet lever 21, one end of the spring abutting the ratchet lever and the other being bent over the pawl. The ratchet lever 21 has the hub 22 which is journaled upon the bushing 23 surrounding the front end of the ratchet plate center 8. 24 is an operating lever which is secured upon the shaft 25 the latter being journaled in the body 1 above the spindle 2. This lever is connected to the ratchet lever to oscillate the same to thereby advance the ratchet plate and consequently the index plate by step by step movement. To accomplish this adjustment and at the same time to secure an accurate indexing, the connection between the operating lever and the ratchet lever is such that the ratchet plate and index plate are advanced at a decreasing velocity, and furthermore, the velocity, at the time the ratchet plate and index plate have reached their predetermined position of adjustment, is very slow and the two plates have nearly become stationary. This connection comprises the crank 26 which is secured upon the shaft 25 near its rear end and the connecting rod 27 which is pivotally connected at one end to the free end of the crank 26 and at the other end to the ratchet lever 21. These parts are so arranged that when the ratchet plate and index plate are in their predetermined positions of adjustment the axes of the pivots connecting the connecting rod to the crank and ratchet lever are substantially in alignment with the axis of the shaft 25. Thus it will be seen that as the ratchet plate and index plate are advanced their angular velocity constantly decreases and when these plates have reached their predetermined position of adjustment their angular velocities are very slow and they have nearly become stationary. As a consequence the work may be accurately indexed even when an index plate of the larger diameter is used.

For the purpose of holding the index plate in its positions of rotative adjustment I have provided the contact point 28 preferably in the nature of a pin which is engageable in the angularly spaced notches 29 located in the periphery of the index plate 7. This contact point is carried near the free end of the rock lever 30 which is pivotally mounted at 31 upon the body 1. As shown in detail, the contact point has a tapering body fitting in a corresponding opening in the rock lever and held therein by means of a nut 32 threaded upon the upper end of the contact point. 33 is a second lever pivoted at 34 upon the body 1 and having a reduced free end portion 35 which is engageable under the reduced free end portion 36 of the rock lever to swing the latter upwardly for the purpose of disengaging the contact point from its notch. 37 is a plunger engageable with the upper end of the contact point 28 and yieldably forced downwardly by means of the coil spring 38 which abuts at its upper end the cap 39 upon the plunger housing 40, the latter being secured to the body 1. This plunger normally holds the contact point in a notch in the ratchet wheel. 41 is a cam secured upon the rear end of the shaft 25 adjacent to the crank 26. 42 is a roller journaled upon the free end of the lever 33 adjacent to its reduced portion 35, this roller being engageable with the cam. The cam is so shaped and positioned upon the shaft 25 that with the parts occupying the positions as shown in Figure 2 rotation of the operating lever 24 the cam 41 moves the roller 42 upwardly thereby swinging the levers 33 and 30 upwardly and disengaging the contact point 28 from the notch 29 in which it had been occupied. When the operating lever has been swung to its limit of travel in this direction it is then swung in the return direction thereby advancing the ratchet plate and the work at the time the index plate has reached its new predetermined position of adjustment the cam allows the roller to ride down which in turn allows the contact point to engage in the succeeding notch of the ratchet plate under the influence of the spring pressed plunger actuated upon the contact point.

The rotation of the operating lever 24 is limited in opposite directions by means of the set screws 43 and 44 which are adjustably mounted upon arms of the operating lever and are engageable with opposite sides of the stop 45 formed upon the body 1. These set screws are adjustable to vary the amount of angular movement of the operating lever to control the different degrees of indexing of the work for each cycle of the operating lever.

From the above description it will be readily seen that I have provided a simple construction of indexing mechanism in which the index member is advanced at a decreasing velocity so that it will not over run the desired predetermined position of adjustment. It will also be seen that I have provided an indexing mechanism in which a common means effects the indexing and at the same time controls the operation of the means for holding the index plate in its various positions of rotative adjustment.

What I claim as my invention is:

1. In indexing mechanism, the combination with a rotatable index plate and a ratchet plate movable therewith, a ratchet lever journaled concentrically with said index plate, a pawl upon said ratchet lever engageable with the teeth of said ratchet plate, a rotatable shaft, a crank upon said shaft and a connecting rod pivotally connected to said crank and to said ratchet lever, the axes of the pivots connecting said connecting rod to said crank and ratchet lever being adapted to be in alignment with the axis of said shaft.

2. In indexing mechanism, the combination with a rotatable index plate and a ratchet plate secured to said index plate, of a rotatable shaft, for advancing said index plate with a step by step movement, a contact point engageable with said index plate for holding the same from rotation, a pivotal lever carrying said contact point, spring pressed means for normally holding said contact point in engagement with said index plate, a second pivotal lever engageable with the free end of said first-mentioned pivotal lever, and a cam upon said shaft for actuating said second pivotal lever.

3. In indexing mechanism, the combination with a rotatable index plate, of means for rotating said index plate including a rotatable shaft and a crank upon said shaft, a contact point engageable with said index plate to hold the same from rotation, a pivotal lever carrying said contact point and a cam secured to said shaft operable upon rotation of the same to engage said lever to control the swinging movement of the same.

In testimony whereof I affix my signature.

ROBERT S. DRUMMOND.